United States Patent [19]

Schott

[11] 4,318,318
[45] Mar. 9, 1982

[54] CUTTING TOOL

[76] Inventor: Lawrence A. Schott, 15940 Warwick, Detroit, Mich. 48223

[21] Appl. No.: 173,272

[22] Filed: Jul. 29, 1980

Related U.S. Application Data

[63] Continuation of Ser. No. 963,975, Nov. 27, 1978, abandoned, which is a continuation-in-part of Ser. No. 825,967, Aug. 19, 1977, Pat. No. 4,159,884, which is a continuation-in-part of Ser. No. 812,450, Jul. 15, 1977, Pat. No. 4,159,885.

[51] Int. Cl.³ .......................... B23B 3/00; B26D 1/00
[52] U.S. Cl. ...................................... 82/1 C; 407/113; 407/114; 407/115; 407/116
[58] Field of Search ............... 82/1 C, 36 R; 407/113, 407/114, 115, 116, 119

[56] References Cited

U.S. PATENT DOCUMENTS

| | | | |
|---|---|---|---|
| 2,630,725 | 3/1953 | Black | 407/113 X |
| 3,137,917 | 6/1964 | Dowd | 407/114 |
| 3,299,489 | 1/1967 | Pohle | 407/113 X |
| 3,344,496 | 10/1967 | Patkay | 407/114 |
| 3,395,434 | 8/1968 | Wirfelt | 407/113 X |
| 4,159,884 | 7/1979 | Schott | 407/113 |
| 4,159,885 | 7/1979 | Schott | 407/114 |

*Primary Examiner*—Harrison L. Hinson
*Attorney, Agent, or Firm*—Hauke and Patalidis

[57] ABSTRACT

A cutting tool, preferably in the form of a cutting insert of hard material, having a narrow land area or ledge along the cutting edge, forming a shallow recessed groove promoting the formation of a false cutting tip build-up during use of the cutting tool, the cutting tip build-up resulting from the transfer of material from the chip to the ledge surface. The cutting tool of the invention enhances and favors the formation of a cutting tip build-up by providing the shallow recessed groove with a width which is a function of the cut taken by the cutting tool in a workpiece such that the chip removed from the workpiece during a cutting operation bridges the recessed groove.

12 Claims, 13 Drawing Figures

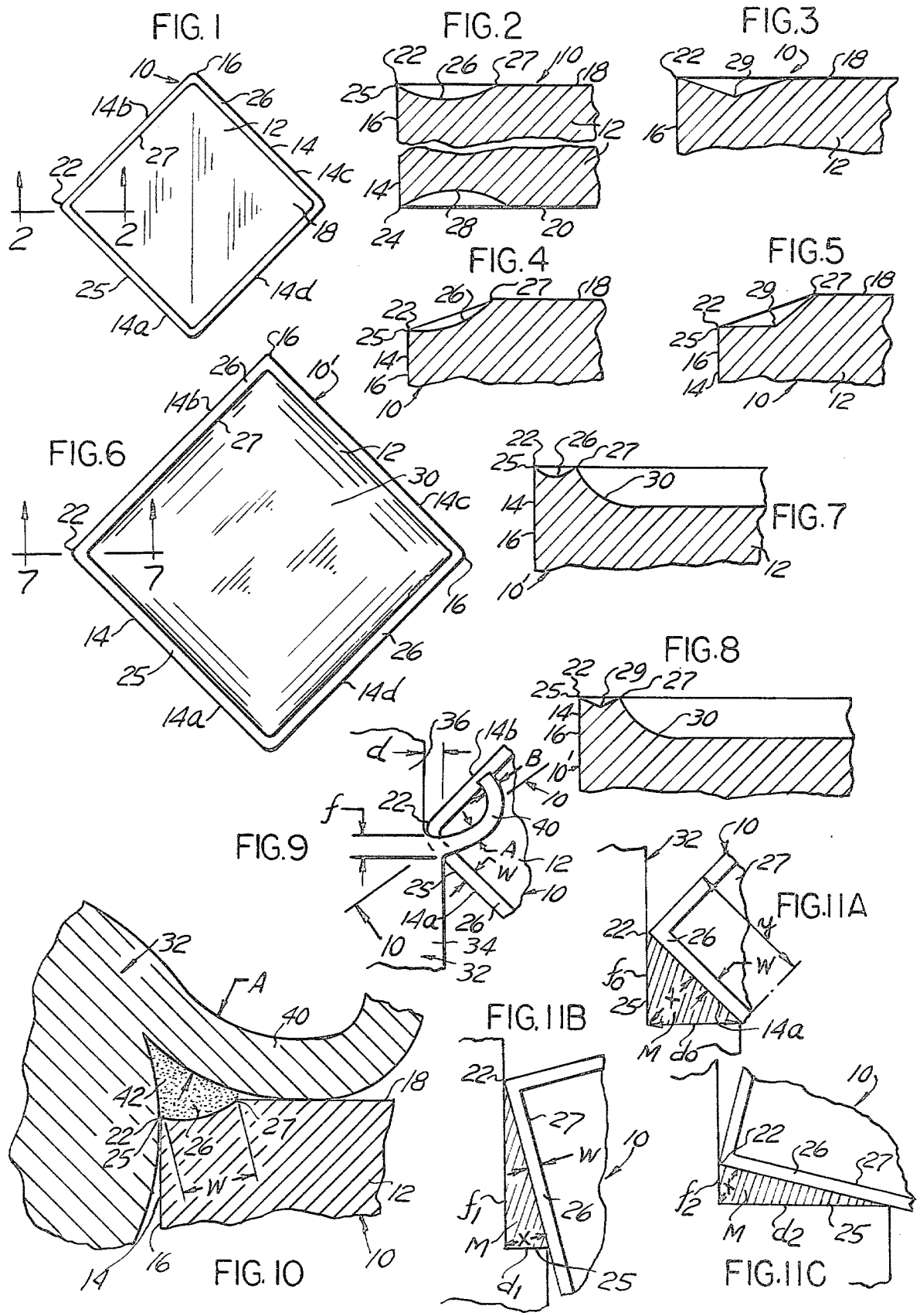

CUTTING TOOL

CROSS-REFERENCE TO RELATED APPLICATIONS

This is a continuation of application Ser. No. 963,975, filed Nov. 27, 1978, now abandoned which is a continuation-in-part of application Ser. No. 825,967, filed Aug. 19, 1977, now U.S. Pat. No. 4,159,884, which is a continuation-in-part of application Ser. No. 812,450, filed July 5, 1977, now U.S. Pat. No. 4,159,885.

BACKGROUND OF THE INVENTION

The present invention relates to a cutting tool geometry in general, and more particularly to the geometry of throw-away cutting inserts so designed as to favor or promote the formation of a false cutting tip build-up at the cutting edge of the cutting tool during normal operation.

Cutting tools made of hard, wear-resistant material, such as cemented metal carbides, generally in the form of throw-away cutting inserts mounted on the tip of an appropriate tool holder, are of common use today when heavy cuts and high cutting speeds are desired. Such cutting inserts are used in combination with appropriate means for controlling the snaking chip removed from the workpiece, so as to break the continuous chip into small individual pieces which fall to the floor or into an appropriate container, without interfering with the cutting edge of the cutting tool, or with the workpiece, and without endangering the machine operator.

The chip control element, or chip breaker, may consist of a separate member which is engaged with the top surface of the cutting tool, at a position remote from the cutting edge or cutting tip and which, once clamped in position, interferes with the free flow of the continuous chip and breaks it into small pieces. Alternatively, chip breakers may take the form of appropriate recesses and rises formed integrally in a cutting insert.

During cutting of a chip from a workpiece, the cutting edge or tip of the tool is subjected to considerable stress and loads, and the material at the cutting edge itself and behind the cutting edge is subject to considerable thermal shock, intense heat and constant abrasion. A stream of coolant and lubricating fluid is generally directed as close to the cutting edge as is permissible under the particular machining conditions. However, because the cutting edge itself is generally masked by the chip being removed from the workpiece, and because of the snaking of the chip and of the random breakage of the chip into small pieces, a free flow path for the lubricant-coolant is unavailable, and the flow is constantly interfered with and interrupted, which further increases the repeated thermal shocks to which the cutting tool is subjected. All those adverse conditions result in rapid wear of the cutting tool, and rapid dulling of the cutting edge.

It has been observed that when a cutting tool removes a chip from a workpiece, a transfer of material particles occurs from the chip and the workpiece to the cutting edge and to the surface of the cutting tool proximate the cutting edge, such transfer of particles causing a false cutting tip to build up on the surface of the cutting tool from the cutting edge to a short distance behind the cutting edge. The formation of such a false cutting edge which builds up on the cutting tool is particularly pronounced when intense heat is generated at the cutting tip, and the particles of material forming the cutting edge build-up become literally welded and strongly adhering to each other, with the particles at the base of the build-up adhering to the surface of the cutting tool. Such build-up of a false cutting tip, which is continuously renewed during cutting of the chip, provides a protective element interposed between the surface of the curling chip and the surface of the cutting tool which prevents direct contact between the chip and the cutting tool surface and cutting edge, such that the life of the cutting tool is greatly improved as the false cutting tip build-up acts as a shield against abrasion of the cutting tool surface and cutting edge by direct contact with the chip, and also as a shield against thermal shocks.

It has been discovered by applicant, as disclosed in the aforesaid applications for Letters Patent, now U.S. Pat. Nos. 4,159,884 and 4,159,885, that the formation of a false cutting tip build-up is greatly improved if the surface of the cutting tool behind the cutting edge is in the form of a very shallow groove, is rough rather than smooth, or is coated with a thin layer of diamond particles adhering to the surface. Either one of those conditions, or a combination of some or all of those conditions, greatly promotes the formation of a false cutting tip build-up on a cutting tool, particularly if precautions are taken to avoid as much as possible disturbing the formation of a free flowing chip.

SUMMARY OF THE INVENTION

According to the present invention, the formation of a false cutting tip build-up is greatly enhanced at the cutting edge of a cutting tool, such as a hard, wear-resistant insert made, for example, of cemented hard metal carbides, ceramics, and the like, by providing the insert with an appropriate geometry promoting the formation of such false cutting tip build-up.

According to the present invention, the cutting insert is provided with a shallow recessed surface forming a grooved edge extending to the insert cutting edge, the depth and the width of the ledge being so dimensioned, that the chip cut from a workpiece is free to flow over the recessed ledge without interference such as to promote the formation of a false cutting tip build-up at the cutting edge and on the ledge. The recessed ledge may be in the form of a shallow concave V-groove or a shallow curvilinear groove. The groove chord may be disposed generally at a 90° angle to the side face of the cutting tool, but preferably it is disposed at an angle of more than 90° with the side face of the cutting tool so as to provide a negative cutting angle. The width of the shallow recessed ledge is related to the thickness of the chip cut from the workpiece, and to the hardness of the workpiece, which in turn determine the radius of curvature of the chip such that the chip bridges the shallow recessed ledge without touching the surface of the ledge, which has been discovered to be a further structural parameter, in addition to, or as an alternative to other factors disclosed in said aforesaid patents.

The many objects and advantages of the present invention will become more apparent to those skilled in the art when the following detailed description of the best modes contemplated for practicing the invention is read in conjunction with the accompanying drawings wherein like reference numerals relate to like parts through the several views, and in which:

BRIEF DESCRIPTION OF THE DRAWING

FIG. 1 is a top plan view of an example of cutting tool in the form of a cutting insert according to the present invention;

FIG. 2 is a partial sectional view thereof along line 2—2 of FIG. 1, at a greatly enlarged scale;

FIG. 3 is a view similar to FIG. 2 but showing a modification thereof;

FIG. 4 is a view similar to FIG. 2 but showing a further modification thereof;

FIG. 5 is a view similar to FIG. 3, but showing a modification thereof;

FIG. 6 is a top plan view of a modification of the cutting tool of FIG. 1;

FIG. 7 is a partial sectional view thereof from line 7—7 of FIG. 6;

FIG. 8 is a view similar to FIG. 7 but showing a modification thereof;

FIG. 9 is a partial schematic top view of a cutting insert according to the present invention while effecting a cut in a workpiece;

FIG. 10 is a partial schematic sectional view along line 10—10 of FIG. 9; and

FIGS. 11A—11C are schematics useful in explaining the interrelation between the width of the shallow groove of a cutting tool according to the present invention as a function of the depth of cut and the feed rate relative to a workpiece.

DETAILED DESCRIPTION OF THE PREFERRED EMBODIMENTS

Referring now to the drawing and more particularly to FIGS. 1-2, a typical cutting tool according to the present invention is in the form, for example, of a polygonal insert 10, made of cemented hard metal carbide which, in the example illustrated, is a square or rectangular plate, having a body 12 provided with a square or rectangular perimeter peripheral surface 14 defining four side faces 14a, 14b, 14c, and 14d, consecutive side faces being joined by partially circular side portions 16. The insert 10 has a top surface 18 and a bottom surface 20 disposed in substantially parallel planes perpendicular to the planes of the side faces forming the peripheral surface 14.

The insert 10 may be of course of a different shape, such as triangular, rectangular, circular, pentagonal, hexagonal, etc., as is well known in the art, and instead of having rounded tips as illustrated at 16, it may be provided with sharp corners or tips. Each corner or tip 16 of the insert 10 forms a cutting tip 22 on the top and a symmetrically disposed cutting tip 24 on the bottom, four such cutting tips being formed one at each corner 16 for a square or rectangular cutting insert 10, as illustrated, and four cutting tips 24, one at each corner, being provided at the bottom of the cutting insert 10. When a cutting tip has been worn, another cutting tip is indexable in a cutting position, and after all the cutting tips on the top, for example, of the insert 10 are worn, the insert is flipped over, and each cutting tip 24 is indexable in turn, after the preceding cutting tip is worn.

In the structure illustrated at FIGS. 1-2, the invention contemplates forming a shallow curvilinear groove 26, when seen in section as in FIG. 2, recessed in the surface 18 of the cutting insert body 12, and extending peripherally all around and behind the perimeter formed by the upper cutting edge 25 of the peripheral surface 14 of the insert. Similarly, a peripheral shallow curvilinear groove 28 may be disposed in the lower surface 20 of the insert body 12 in structures for reversible cutting inserts. The shallow groove 26 extends radially and is parallel to the edge of the cutting insert about the whole periphery of the cutting tip 22. The width of the shallow groove 26 may vary from a fraction of 1 mm to a few mm, according to the depth of the cut that it is desired to take in a workpiece, the hardness of the workpiece and the speed of the cut as will be explained hereinafter in greater detail. The chord of the groove 26 is disposed at a 90° angle to the peripheral surface 14 of the insert body 12. The shallow groove 26, extending all the way to the cutting edge 25 or cutting tip 22 of the cutting insert body 12, promotes the formation of a false cutting tip build-up. However, because the presence of a false cutting tip build-up is most desirable when a heavy cut is taken in a workpiece, the shallow groove 26 generally may reach a width of a few millimeters, rather than a fraction of 1 mm, when cutting a very hard workpiece and the maximum depth of the groove is in the order of 1/20 to 1/5 of the width of the groove.

As shown at FIG. 3, the shallow groove may be in the form of a V-groove 29, rather than the curvilinear shape illustrated at FIG. 2.

FIG. 4 represents, schematically, a section at the cutting tip of a K-line, or K-land, type of cutting insert 10, wherein a shallow groove 26 is formed at the cutting tip and cutting edge instead of the flat ledge with which conventional K-line, or K-land, cutting inserts are provided. FIG. 5 illustrates a V-groove 28 formed at the cutting tip 22 and cutting edge 25 instead of the curvilinear groove 26 of FIG. 4, in a similar type of cutting insert. As hereinbefore mentioned in the Summary, the chord of the shallow groove 26 or V-groove 28 is thus disposed at an angle of more than 90° to the side or peripheral surface 14.

FIGS. 6 and 7 illustrate a cutting insert 10' of the design generally disclosed in co-pending application, Ser. No. 812,450, now U.S. Pat. No. 4,159,885 that is with a recessed top surface 30, and also a recessed bottom surface in structures for reversible inserts, which extends from the trailing edge 27 of the shallow groove 26 over all the surface of the cutting insert body 12. As illustrated at FIG. 8, the shallow curvilinear groove 26 may be replaced by a shallow V-groove 29.

As shown in the schematic view from the top of FIG. 9, a cutting insert 10 provided with a shallow-groove 26 about the periphery of the cutting insert body 12, when mounted in an appropriate holder in the carriage of a lathe, not shown, for example, is adapted to take a cut in a rotating workpiece 32. The cut being effected in the workpiece 32 reduces its outside diameter from a large diameter portion 34 to a smaller diameter portion 36, as is well known in the art. The distance d represents the depth of cut, that is a predetermined lateral setting of the cutting insert 10 effecting a cut in the workpiece 32. For each revolution of the workpiece 32, the carriage, not shown, supporting the cutting tool or cutting insert 10 is advanced longitudinally relative to the workpiece 32 of a certain distance f for each revolution of the workpiece. The cutting insert 10, shown in FIG. 9, has arbitrarily been chosen to be a square or rectangular cutting insert, that is a cutting insert wherein two consecutive cutting edges 25 at the junction, for example, of two consecutive side faces 14a and 14b, form a 90° angle at the cutting tip 22. The cutting insert 10 has been further arbitrarily shown oriented in the cutting insert holder, not shown, such as to have its side faces 14a and 14b form a 45° angle with the longitudinal axis of the workpiece 32. During the cutting operation, a chip 40 is removed from the workpiece 32. The chip 40 has a thickness A which is substantially equal to the lateral feed, or depth of cut d of the cutting insert 10 into the workpiece 32, and which has a width B which is substantially equal to the hypotenuse of a right triangle whose sides are equal respectively to d and f. In the position illustrated in FIG. 9, the depth of cut d having been chosen arbitrarily to be equal to the feed f, the thickness A of the chip 40 is also equal to d and to f.

As shown at FIG. 10, the chip 40, when separating from the workpiece 32, tends to curve upwardly and engages the top surface 18 of the cutting insert body 12 beyond the trailing edge 27 of the shallow groove 26, as long as the width W of the shallow groove 26 is less than a predetermined dimension. The amount of curvature of the chip 40 depends on the composition of the material of the workpiece 32 and on its hardness and, for a given material and hardness, the radius of curvature of the chip 40 decreases as a function of its thickness A and, to a lesser degree, as a function of its width B, therefore substantially as a function of its cross area AB/2, assuming a triangular shape in section. As long as the lower surface of the chip 40 first impacts the upper surface 18 of the cutting insert 10 beyond the trailing edge 27 of the shallow groove 26, the formation of a false cutting edge 42 is enhanced on the top of the surface of the shallow groove 26. The chip 40 curves more when a shallow cut is made in the workpiece 32, and the chip 40 curves much less when a heavy cut is taken in the workpiece, such that the width of the shallow groove 26 of the cutting insert 10 of the invention is preferably narrow in tools designed for taking small cuts in a workpiece and relatively wider in tools designed to take heavy cuts in a workpiece. The important consideration is that the width W of the groove 26 be small enough such that the groove does not act as a chip breaker.

For a lathe-turning operation, the amount of material removed from the workpiece by a cutting tool is a function of the depth of cut d and of the longitudinal advance or feed f of the cutting tool per revolution of the workpiece. In other words, with reference to the diagram of FIG. 11a, using a cutting tool or cutting insert 10, according to the present invention, and having a cutting edge 25 formed at the junction between a side face 14a and the edge of a shallow groove 26 disposed at 45° to the axis of the workpiece 32, the volume of material removed in the course of a revolution is a function of the depth of cut $d_o$ and of the feed $f_o$. The volume of material removed is proportional to the cross-hatched area M of FIG. 11a. The area M is expressed by the following equation:

$$M = (f_o \times d_o)/2 \qquad (a)$$

FIG. 11B diagrammatically illustrates a cutting operation with a feed $f_1$ which is twice $f_o$, but while effecting a depth of lateral cut in the workpiece which is $d_1$, equal to one-half the depth of cut $d_o$. The area M shown in cross-hatch at FIG. 11B is therefore equal to the area M of FIG. 11A.

Similarly, while effecting a cut as shown diagrammatically at FIG. 11C, with a different orientation of the cutting tool insert 10, such that the lateral depth of cut $d_2$ is equal to twice $d_o$, while the longitudinal feed in the course of a revolution, $f_2$, is equal to one-half $f_o$, the cross-hatched area M remains the same.

In other words, $$M = f_o d_o/2 = f_1 d_1/2 = f_2 d_2/2 = fd/2 \qquad (b)$$

as long as the volume of material removed from the workpiece remains the same in the course of a single revolution of the workpiece.

Referring again to FIG. 11a, the area M is also equal to xy/2, y being the hypotenuse of the right triangle whose sides at right angles are respectively $f_o$ and $d_o$, and x being the height of that triangle. The relationship may be expressed as follows:

$$M = fd/2 = xy/2, \qquad (c)$$

wherein x has its largest possible value, i.e. $x = y/2$, or $2x = y$. However, in the triangle of FIG. 11A, the equation $$M = fd/2 = xy/2 \qquad (c)$$

becomes:

$$M = fd/2 = 2x \cdot x/2, \text{ or} \qquad (d)$$

$$4x^2 = 2fd, \text{ or} \qquad (e)$$

$$2x^2 = fd, \text{ or} \qquad (f)$$

$$x^2 = fd/2, \text{ or} \qquad (g)$$

$$x = \sqrt{fd/2} \qquad (h)$$

It has been observed that for the shallow groove 26 of the cutting insert 10 to enhance the formation of a false cutting tip 42, FIG. 10, resulting from the condensation and adhesion of metallic particles removed from the workpiece and the chip being caused to accumulate as a solid mass in the shallow groove 26, the width W of the groove 26 must be smaller than x, as modified by a constant depending from the hardness of the material of the workpiece. In other words, $$W \leq K_H x, \text{ or} \qquad (i)$$

$$W \leq K_H \sqrt{fd/2} \qquad (j)$$

$K_H$ is in turn substantially equal to 1/100th of the Brinell hardness of the material, such as steel or steel alloy, of which the workpiece is made.

EXAMPLE 1

A workpiece of 1020 carbon steel, having a Brinell hardness of 100, is turned on a lathe using a carbide cutting insert according to the present invention. The depth of cut is 0.100 in. (2.54 mm), and it is desired to operate at a longitudinal feed of 0.015 in. per revolution (0.38 mm). The width of the shallow groove is determined by the formula (j) as follows:

$$W \leq K_H \sqrt{df/2} = 1\sqrt{2.54 \times 0.38/2} = 0.78 \text{ mm}$$

A cutting tool with a peripheral groove of less than 0.78 in width is thus suitable for effecting a cutting operation while enhancing the formation of a false cutting tip build-up, as for example, 0.5 or 0.6 mm wide groove, or approximately 0.020 in. wide.

EXAMPLE 2

A workpiece of 8620 steel having a Brinell hardness of 400, is to be bored with a boring tool having a pair of diametrally disposed carbide inserts according to the present invention, the depth of cut being 0.10 in. (2.54 mm) and the feed of the tool being 0.007 in. (0.18 mm), or 0.0035 in (0.09 mm) for each insert. The width of the shallow groove at the cutting edge or cutting tip of the inserts is given by the formula:

$$W \leq K_H \sqrt{df}/2 = 4\sqrt{2.54 \times 0.09}/2 = 1.35 \text{ mm}$$

A width of groove of less than 1.35 mm, for example a groove 1 mm wide, of approximately 0.040 in. is suitable.

The principle of the invention also applies to machining operations other than turning and boring, such as drilling, broaching, or shaping, for example, although such operations are not conducive to forming a false cutting tip build-up in view of the discontinuous cutting, or interrupted cutting of the workpiece, and the short duration of each cutting operation. For such machining operations, the surface speed of cutting is converted into an equivalent feed per revolution, assuming that a workpiece of the same material will be turned on a lathe, or bored.

Having thus described the present invention by way of typical structural embodiments thereof, modification whereof will be apparent to those skilled in the art, what is claimed as new is as follows.

I claim:

1. A method for promoting the formation of a false cutting tip build-up on a cutting tool during use of said cutting tool for cutting a workpiece, said method comprising forming said cutting tool with a top surface and a peripheral surface providing a cutting edge at the junction between said top surface and said peripheral surface, said junction defining at least one cutting tip, disposing a perimetric shallow relatively narrow groove in said top surface such that said perimetric shallow groove has an edge disposed at said cutting edge at least at said cutting tip, and effecting a cut in said workpiece to a depth such that the distance bridged by a chip removed from said workpiece by said cutting edge is longer than the width of said groove and said chip engages said top surface without engaging said groove, whereby a false cutting tip build-up is formed in said groove.

2. The method of claim 1 further comprising disposing the chord of said perimetric shallow groove at an angle of more than 90° to the peripheral surface of said cutting tool.

3. The method of claim 1 wherein said perimetric groove is in the form of a V-groove.

4. The method of claim 1 wherein said perimetric groove is curvilinear in radial section.

5. The method of claim 1 wherein said perimetric groove has a width narrower than the thickness of said chip.

6. The method of claim 1 wherein said perimetric groove has a width narrower than the width of a chip breaker groove.

7. The method of claim 1 wherein said perimetric groove at the cutting tip of said tool has a width obtained by the formula:

$$W \leq K_H \sqrt{df}/2,$$

wherein
$K_H = 1/100$ of Brinell hardness of a workpiece,
$d$ = depth of cut into said workpiece, and
$f$ = longitudinal feed into said workpiece.

8. In a cutting tool having a cutting edge for removing a chip from a workpiece and a planar top surface, a false cutting edge retaining portion extending from said cutting edge, said portion being a relatively narrow groove providing an anchoring surface for said false cutting tip formed by transfer of material from the chip removed from the workpiece, wherein said groove is narrow enough for enabling said chip to engage the top surface of said cutting tool beyond said groove without breaking said chip and said groove has a chord disposed at an angle of more than 90° to a corresponding side face of the cutting tool.

9. The cutting tool of claim 8 wherein said groove is in the form of a V-groove.

10. The cutting tool of claim 8 wherein said groove is curvilinear in radial section.

11. The cutting tool of claim 8 wherein said groove has a width narrower than the thickness of said chip.

12. The cutting tool of claim 7 wherein said groove has a width obtained by the formula:

$$W \leq K_H \sqrt{df}/2,$$

wherein:
$K_H = 1/100$ of Brinell hardness of a workpiece,
$d$ = depth of cut into said workpiece, and
$f$ = longitudinal feed into said workpiece.

* * * * *